United States Patent
Adams et al.

(10) Patent No.: US 12,348,472 B2
(45) Date of Patent: *Jul. 1, 2025

(54) PROXY DEVICE FOR SECURE COMMUNICATION BETWEEN THIRD-PARTY SERVICE AND MAIL SERVER

(71) Applicant: Charles Schwab & Co., Inc., San Francisco, CA (US)

(72) Inventors: Richard Alan Adams, Omaha, NE (US); Ronald Glenn Martel, Jr., Omaha, NE (US); Daniel Sass, Bennington, NE (US); Glenn A. Rose, Hanover, MD (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,790

(22) Filed: Jan. 16, 2024

(65) Prior Publication Data
US 2024/0223522 A1 Jul. 4, 2024

Related U.S. Application Data

(63) Continuation of application No. 17/035,623, filed on Sep. 28, 2020, now Pat. No. 11,962,553.

(51) Int. Cl.
*H04L 51/212* (2022.01)
*H04L 9/40* (2022.01)
*H04L 51/08* (2022.01)

(52) U.S. Cl.
CPC ............ *H04L 51/212* (2022.05); *H04L 51/08* (2013.01); *H04L 63/0281* (2013.01); *H04L 63/145* (2013.01); *H04L 63/18* (2013.01)

(58) Field of Classification Search
CPC ..... H04L 51/12; H04L 51/08; H04L 63/0281; H04L 63/145; H04L 63/18
See application file for complete search history.

(56) References Cited

U.S. PATENT DOCUMENTS

| | | | | |
|---|---|---|---|---|
| 2002/0116232 A1* | 8/2002 | Rapp | ..................... | G06Q 10/109 705/5 |
| 2003/0061087 A1* | 3/2003 | Srimuang | ............ | G06Q 10/109 705/7.18 |
| 2006/0224427 A1* | 10/2006 | Salmon | ............ | G06Q 10/06312 705/7.22 |

(Continued)

*Primary Examiner* — William G Trost, IV
*Assistant Examiner* — Adam A Cooney
(74) *Attorney, Agent, or Firm* — Harness, Dickey & Pierce, P.L.C.

(57) ABSTRACT

A method of operating a proxy module connected in between a third-party scheduling service and a mail server in a communications network includes receiving, at the proxy module, a request to access a resource of a first agent. The method includes generating a first determination results by determining whether a request type of the received request is an allowed request type. The method includes generating a second determination result by determining whether the first agent is an allowed agent. The method includes, based on the first and second determination results, formatting the received request in accordance with a format associated with the mail server and providing the formatted request to the mail server.

15 Claims, 4 Drawing Sheets

(56) References Cited

U.S. PATENT DOCUMENTS

| | | | |
|---|---|---|---|
| 2008/0313005 A1* | 12/2008 | Nessland | G06Q 10/06 |
| | | | 705/7.29 |
| 2010/0080383 A1* | 4/2010 | Vaughan | H04L 9/0827 |
| | | | 713/150 |
| 2011/0270643 A1* | 11/2011 | Reichman | G06Q 10/109 |
| | | | 705/7.19 |
| 2012/0066411 A1* | 3/2012 | Jeide | H04L 67/1095 |
| | | | 709/248 |
| 2012/0116830 A1 | 5/2012 | Loring et al. | |
| 2012/0150581 A1 | 6/2012 | McPhail | |
| 2012/0232946 A1* | 9/2012 | Cocanougher | G06Q 10/109 |
| | | | 705/7.19 |
| 2013/0325503 A1* | 12/2013 | Abrahams | G16H 15/00 |
| | | | 705/2 |
| 2014/0081690 A1 | 3/2014 | Winters | |
| 2014/0278673 A1* | 9/2014 | Wetzold | G06Q 10/1095 |
| | | | 705/7.19 |
| 2015/0379284 A1 | 12/2015 | Stuntebeck | |
| 2020/0286199 A1* | 9/2020 | Maddipati | G06F 16/29 |
| 2020/0288274 A1* | 9/2020 | Burcheci | H04W 4/029 |
| 2020/0396190 A1* | 12/2020 | Pickman | H04L 67/306 |

\* cited by examiner

PROXY DEVICE FOR SECURE COMMUNICATION BETWEEN THIRD-PARTY SERVICE AND MAIL SERVER

CROSS-REFERENCE TO RELATED APPLICATIONS

This application is a Continuation of, and claims priority under 35 U.S.C. § 120 to, U.S. application Ser. No. 17/035,623, filed on Sep. 28, 2020, the entire contents of which are incorporated herein by reference.

FIELD

The present disclosure relates to network security and more particularly to providing increased security with respect to third-party access to internal resources.

BACKGROUND

For security reasons, companies often provide barriers between certain internal network resources and external entities including, for example, clients and third-party vendors. However, these barriers can sometimes result in increased delay for certain client actions, thus reducing the quality of the experience of a client attempting to utilize the company network. For example, certain third-party scheduling services allow clients to schedule appointments with agents of a company. However, due to security concerns, the company network may provide the third-party scheduling service with limited or no access to relevant network resources. As a result, the process of scheduling an appointment may become cumbersome and may include several errors which reduce the quality of service for the client trying to schedule the appointment.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to at least some example embodiments, a method of operating a proxy module connected in between a third-party scheduling service and a mail server in a communications network includes receiving, at the proxy module, a request to access a resource of a first agent; generating a first determination results by determining whether a request type of the received request is an allowed request type; generating a second determination result by determining whether the first agent is an allowed agent; and based on the first and second determination results, formatting the received request in accordance with a format associated with the mail server and providing the formatted request to the mail server.

The method may further include, in response to detecting one or more error events, logging, by the proxy module, the detected one or more error events.

The method may further include, determining whether the received request includes one or more attachments.

The method may further include, in response to determining that the received request includes one or more attachments, preventing the attachments from being sent to the mail server.

The method may further include in response to determining that the received request includes one or more attachments, determining whether the one or more attachments include a virus or other malware; in response to determining that the one or more attachments include a virus or other malware, preventing the attachments from being sent to the mail server; and in response to determining that the one or more attachments do not include a virus or other malware, sending the attachments to the mail server with the received request.

The received request may be associated with scheduling an appointment with the first agent.

The resource of the first agent may be a calendar of the first agent.

The received request may include an email of the first agent and the generating a second determination result by determining whether the first agent is an allowed agent may include referencing, by the proxy module, previously stored email information indicating emails of allowed agents and determining whether the first agent is one of the allowed agents based on the emails of the allowed agents indicated by the previously stored email information.

The received request may be received, at the proxy module, via an encrypted communications protocol and the formatted request may be provided, by the proxy module to the mail server, via an encrypted communications protocol.

According to at least some example embodiments, a proxy module for facilitating secure communications between a third-party service and a mail server includes memory storing computer-executable instructions and at least one processor configured to execute the computer-executable instructions and the computer executable instructions include receiving, at the proxy module, a request to access a resource of a first agent; generating a first determination results by determining whether a request type of the received request is an allowed request type; generating a second determination result by determining whether the first agent is an allowed agent; and based on the first and second determination results, formatting the received request in accordance with a format associated with the mail server and providing the formatted request to the mail server.

The computer-executable instructions may further include, in response to detecting one or more error events, logging, by the proxy module, the detected one or more error events.

The computer-executable instructions may further include determining whether the received request includes one or more attachments.

The computer-executable instructions may further include, in response to determining that the received request includes one or more attachments, preventing the attachments from being sent to the mail server.

The computer-executable instructions may further include in response to determining that the received request includes one or more attachments, determining whether the one or more attachments include a virus or other malware; in response to determining that the one or more attachments include a virus or other malware, preventing the attachments from being sent to the mail server; and in response to determining that the one or more attachments do not include a virus or other malware, sending the attachments to the mail server with the received request.

The received request may be associated with scheduling an appointment with the first agent.

The resource of the first agent may be a calendar of the first agent.

The received request may include an email of the first agent and the generating a second determination result by determining whether the first agent is an allowed agent may include referencing, by the proxy module, previously stored email information indicating emails of allowed agents and determining whether the first agent is one of the allowed agents based on the emails of the allowed agents indicated by the previously stored email information.

The received request may be received, at the proxy module, via an encrypted communications protocol and the formatted request may be provided, by the proxy module to the mail server, via an encrypted communications protocol.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
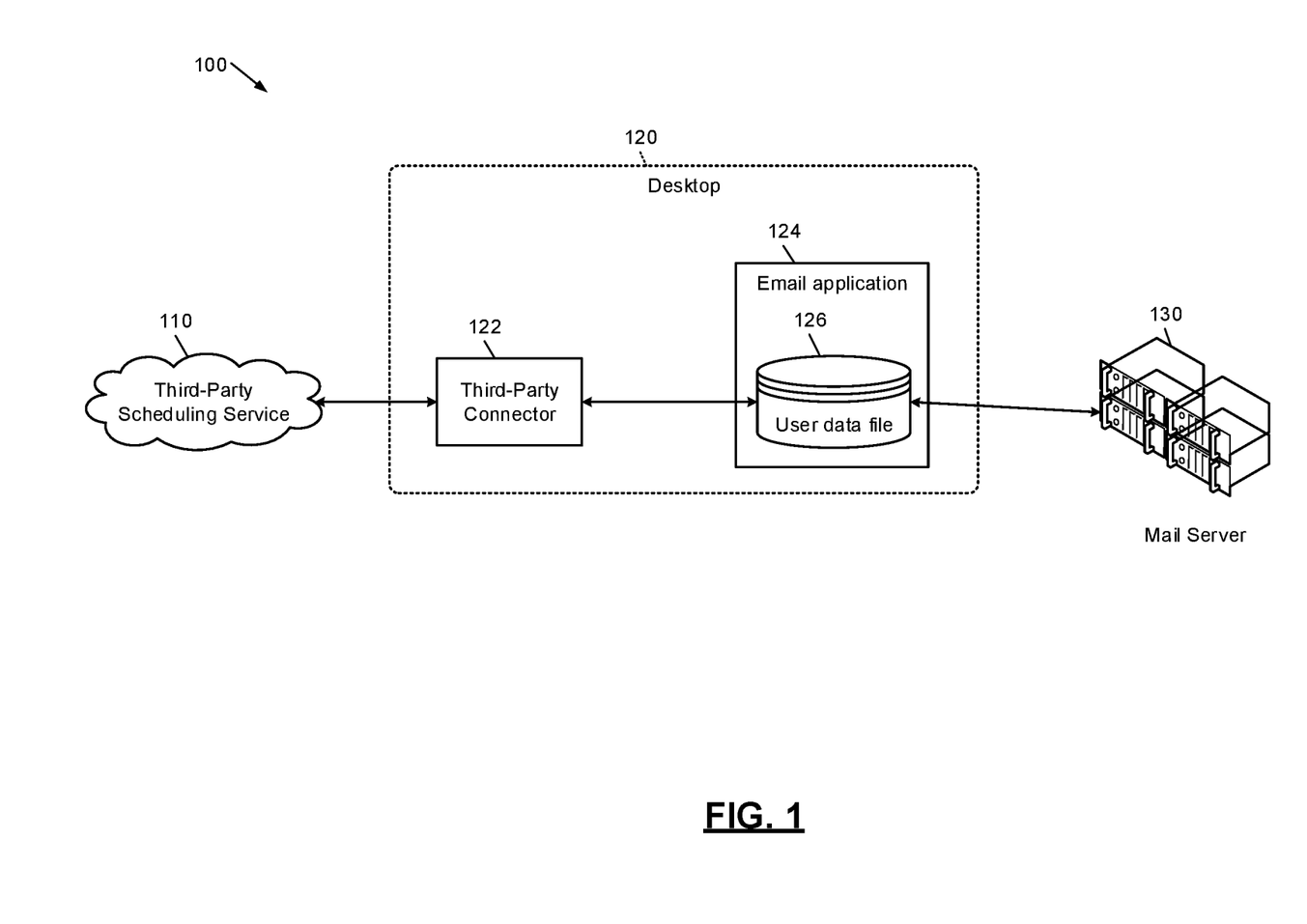
FIG. 1 is a diagram illustrating a portion of a communications network including a first scheduling system.

FIG. 1 illustrates a portion of a communications network that includes a first scheduling system 100. First scheduling system 100 includes a third-party scheduling service 110, a desktop 120 of an agent's computer and a mail server 130. The desktop 120 includes an email application 124 and a third-party connector 122 for providing an interface between the third-party scheduling service 110 and the email application 124. The email application 124 may store email/calendar information in a user data file 126. The email application 124 may connect with the mail server 130 through, for example, a private company network or a virtual private network (VPN). In the example illustrated in FIG. 1, the email application 124 is the OUTLOOK email application from Microsoft Corp., the user data file 126 is an OUTLOOK format data file (for example, a .PST file or .OST file) and the mail server 130 is a MICROSOFT EXCHANGE SERVER email system from Microsoft Corp.

When a client wishes to schedule an appointment with an agent of the company associated with desktop 120 and mail server 130, the client may use the third-party scheduling service 110, which may communicate with an email application 124 of the company agent via the third-party connector 122. The third-party scheduling service 110 may be a network or cloud-based scheduling service that connects with the third-party connector 122, for example, via the Internet. Examples of the third-party scheduling service 110 and the third-party connector 122 include, but are not limited to, the TIMETRADE scheduling service and the TIMETRADE connector (also referred to as an extension) for OUTLOOK, both from TimeTrade, Inc. The TIMETRADE connector (or extension) for OUTLOOK may also be referred to as an "OUTLOOK connector" or "OUTLOOK extension."

The client may access the third-party scheduling service 110 through an internet portal accessible via a web browser and/or a mobile device app, and use the third-party scheduling service to (i) view available times of a company agent as indicated by the company agent's calendar on the mail server 130, and (ii) schedule a meeting with the company agent for a particular time. When the client uses the third-party scheduling service 110 to select a free time slot of the company agent for a meeting with the company agent, the third-party scheduling service 110 may provide a meeting invitation to the company agent.

When a client uses the third-party scheduling service 110 to access calendar information of a particular company agent, the third-party scheduling service may provide the client with access to a copy (e.g., a scheduling service copy) of the company agent's calendar information. The scheduling service copy of the calendar information may be synchronized with a mail server copy of the company agent's calendar periodically. Accordingly, during times when changes have been made to either the scheduling service copy of the calendar or the mail server copy of the company agent's calendar, and the two calendars have not yet been synchronized, undesirable scheduling events, such as double booking of the company agent may occur.

Further, for some implementations of the first scheduling system 100 described above with respect to FIG. 1, it may be necessary for the company agent to manually accept meeting invitations and/or manually synchronize the scheduling service and mail server copies of the company agents' calendars, for example, by manually controlling the email application 124 to accept a meeting invitation and/or manually controlling the third-party connector 122 and email application 124 to perform a synchronization (or, "sync") operation.

Accordingly, it would be advantageous to provide a way to avoid the need for a company agent to manually perform operations such as synchronizing scheduling service and mail server copies of the company agent's calendar and accepting meeting invitations. Further, it would be advantageous to avoid undesirable scheduling events such as double-booking.

One solution to the above-referenced issues would be to provide the third-party scheduling service 110 with direct access to the mail server 130, so the third-party scheduling service 110 could access current calendar information of company agents directly, thus reducing or, alternatively, removing the need for manual intervention by the company agent for scheduling operations and reducing or, alternatively, eliminating, the occurrence undesirable scheduling events such as double booking caused by differences between scheduling service and mail server copies of a company agent's calendar.

Figure 2:
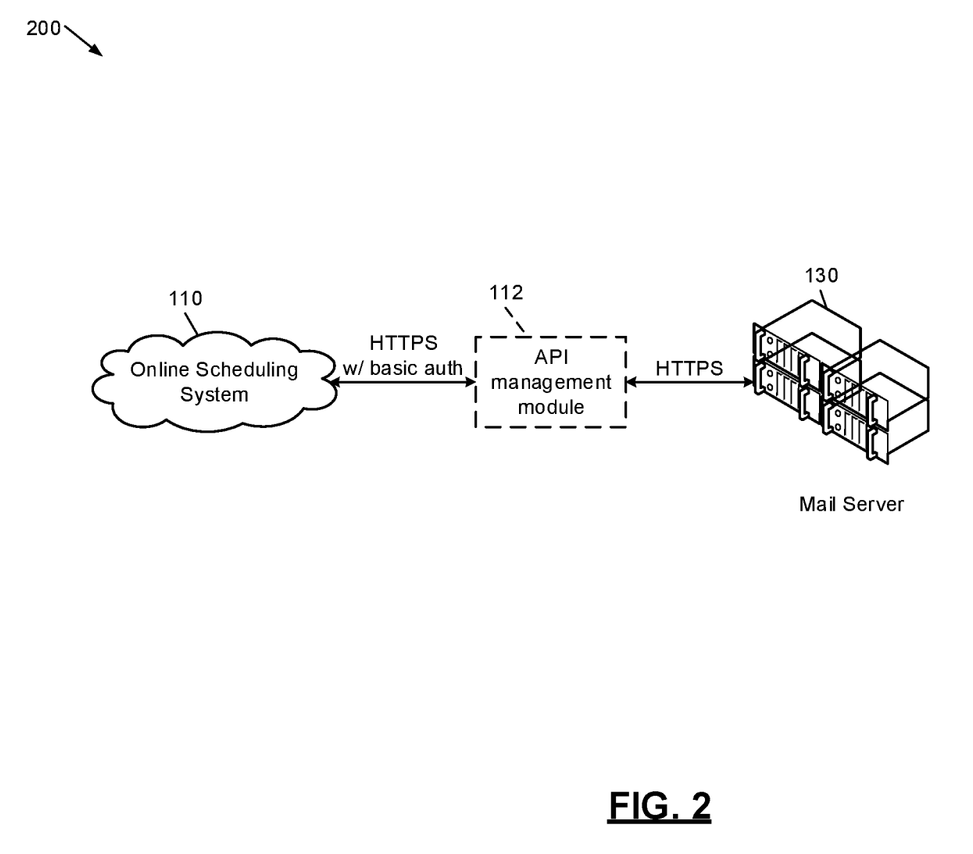
FIG. 2 is a diagram illustrating a portion of a communications network including a second scheduling system.

For example, FIG. 2 is a diagram illustrating a portion of a communications network including a second scheduling system 200. As is illustrated in FIG. 2, the third-party scheduling service 110 may be connected to the mail server 130 directly or, for example, through only an application programming interface (API) management module 112. In the second scheduling system 200, the third-party scheduling service 110 is provided with more direct access to the mail server 130 relative to the first scheduling system 100 of FIG. 1. Accordingly, in the second scheduling system 200, the third-party scheduling service 110 can access current calendar information of company agents directly without the need to go through an extension on an email application of a company agent. Thus, relative to the first scheduling system 100 of FIG. 1, the second scheduling system 200 reduces or, alternatively, removes the need for manual intervention by the company agent for scheduling operations and reduces or, alternatively, eliminates, the occurrence undesirable scheduling events such as double booking caused by differences between scheduling service and mail server copies of a company agent's calendar.

However, for many companies, providing direct access to an internal network resource such as the mail server 130 or data stored within the mail server 130, in the manner shown with respect to the second scheduling system 200 of FIG. 2 for example, violates company network security requirements. For example, providing such access to a third-party vendor could create additional vectors for hackers to access private company information and/or critical company systems. Further, there are a number of reasons why it may be undesirable to provide clients with direct access to company agent calendar information (e.g., through a third-party service) including, for example, unintentional and/or unauthorized alteration, deletion of copying of a company agent's calendar data by the client.

Thus, according to at least some example embodiments, in order to address the above-referenced issues associated with providing a third-party service with direct access to internal company network resources such company agent calendar information stored on a company mail server, one or more proxy modules may be used such that requests from a third-party service may be handled by, for example, a company mail server, without providing the third party service with direct access to the company server. Examples of a scheduling system including such a proxy module according to at least some example embodiments will now be discussed in greater detail, below, with reference to FIGS. 3-4.

Figure 3:
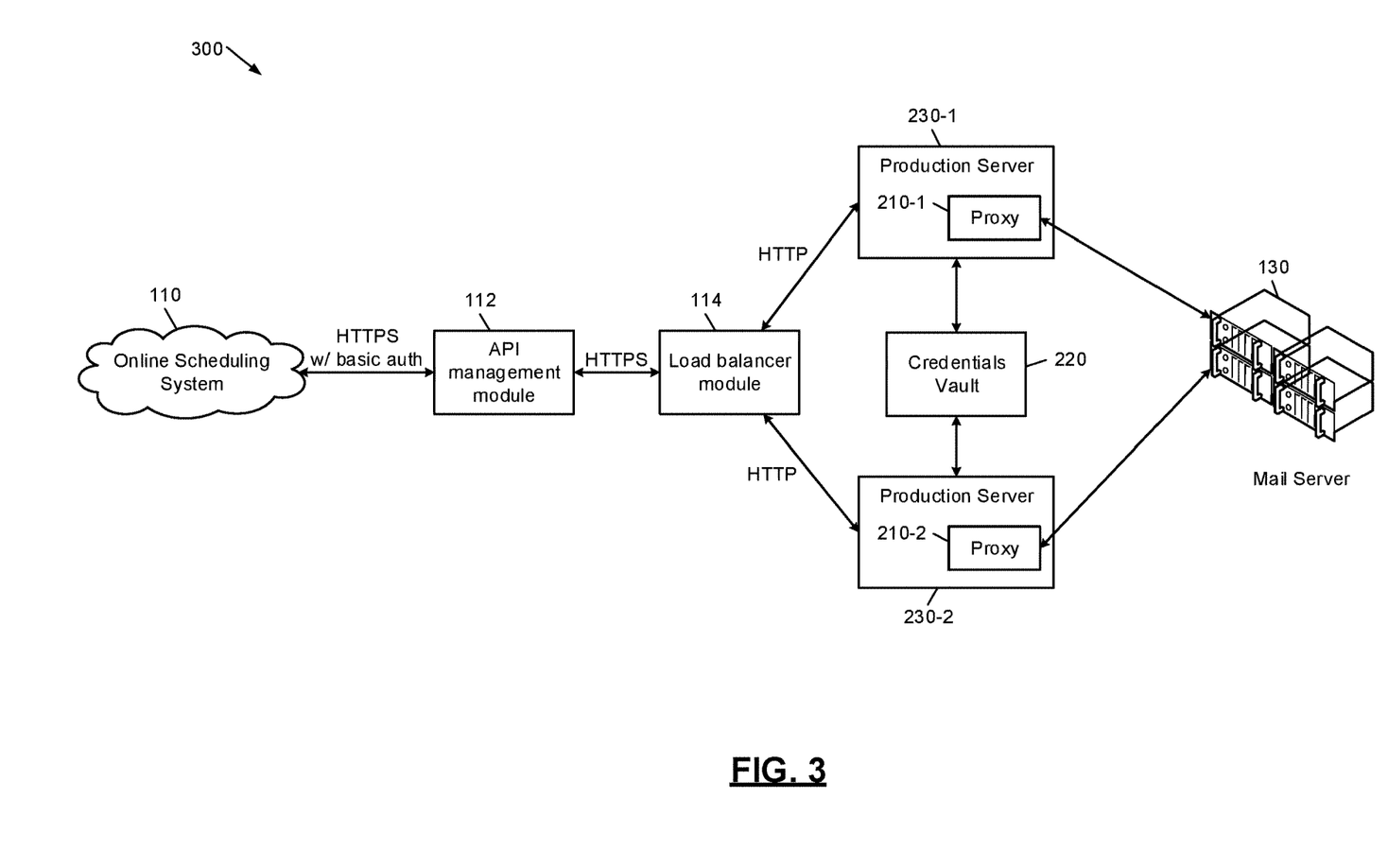
FIG. 3 is a diagram for explaining a proxy module according to principles of the present disclosure.

FIG. 3 is a diagram for explaining a proxy module according to principles of the present disclosure. FIG. 3 illustrates a portion of a communications network that includes a third scheduling system 300. As is shown in FIG. 3, the third scheduling system 300 includes the third-party scheduling service 110, the API management module 112, a load balancer module 114, one or more proxy modules 210, a credentials vault 220, production server 230-1 and production server 230-2, and the mail server 130. Though, for the purpose of simplicity, FIG. 3 illustrates a single mail server 130, the third scheduling system 300 can include multiple mail servers. Further the multiple mail servers can be of different types. For example, the third scheduling system 300 may include one or more mail servers of a first email system and/or include one or more mail servers of a second, different, email system. Further, the third scheduling system 300 may include one or more mail servers that are located on-premises (e.g., physically located at the company with which the mail servers are associated) and/or include one or more mail servers that are not located on-premises (e.g., cloud-based mail servers).

In various implementations, the third-party scheduling service 110 may be the TIMETRADE scheduling service from TimeTrade, Inc. In various implementations, the API management module 112 may be the APIGEE API management system from Google LLC. In various implementations, the load balancer module 114 may be implemented by a virtual internet protocol (VIP) load balancer, such as the NETSCALER load balancer from Citrix Systems, Inc. In various implementations, the mail server 130 may be the MICROSOFT EXCHANGE SERVER email system from Microsoft Corp.

In various implementations, in the third scheduling system 300 there may be two or more proxy modules 210—the example of FIG. 3 shows two proxy modules, proxy module 210-1 and proxy module 210-2 (collectively, proxy modules 210). The proxy modules 210 may be implemented by respective production servers—the example implementation of FIG. 3 depicts two, production server 230-1 and production server 230-2. For the purpose of simplicity, the singular term "the proxy module 210" is used, on occasion, in the present specification. Operations, attributes, features, etc. described in the present specification with respect to "the proxy module 210" may apply to either one of the proxy modules 210-1 and 210-2, or both of the proxy modules 210-1 and 210-2.

Further, the proxy module 210 may use the credentials vault 220 for storing credentials used to generate tokens for accessing the mail server 130. For example, when the mail server 130 is a MICROSOFT EXCHANGE SERVER email system, the proxy module 210 may use the credentials vault 220 to generate OUTLOOK tokens to access the MICROSOFT EXCHANGE SERVER email system (i.e., the mail server 130). For example, according to at least some example embodiments, the credentials stored in the credentials vault 220 may be used by proxy module 210 to authenticate with the MICROSOFT AZURE platform, from Microsoft Corp., in order to generate an OAuth token to be used for requests sent to the MICROSOFT EXCHANGE SERVER email system (i.e., the mail server 130).

In comparison to the first scheduling system 100, the third scheduling system 300 facilitates a client's ability to use the third-party scheduling service 110 to perform authorized operations with respect to a company agent's calendar without requiring direct manual intervention by the company agent and without exposing internal company network resources to unsecure access by clients, third-party vendors and/or hackers. For example, the proxy module 210 provides a barrier between the client/third-party scheduling service 110 and the mail server 130.

Security Features

The following is an example list of security features that may be implemented by the third scheduling system 300 according to at least some example embodiments. Example security features a-k are provided below. According to at least some example embodiments, the third scheduling system 300 may include one, some or all of security features a-k. For example, the third scheduling system 300 may include any security feature(s) from among security features a-k while excluding the remaining security feature(s) from among security features a-k. Further, according to at least some example embodiments, the third scheduling system 300 is not limited to security features a-k, and thus, may include additional security features that are not among security features a-k.

a) The third scheduling system 300 performs a vulnerability scan on one or more elements of the scheduling system (e.g., using Black Duck® and/or Micro Focus® Fortify®) before the proxy module 210 accesses the mail server 130.

b) Access is controlled on a third-party vendor IP address-basis by a whitelist identifying authorized third-party vendor IP addresses at the Apigee layer (i.e., the API management module 112).

c) The Apigee layer (i.e., the API management module 112) provides authentication and authorization functions to ensure that only third-party service requests which are associated with authorized third-party vendor IP addresses are allowed to access an API managed by the Apigee layer.

d) The third scheduling system 300 (e.g., the proxy module 210) defines which API calls, from among all available API calls, are allowed API calls that correspond to allowed functions of the third-party scheduling service 110 with respect to data of the mail server 130, and the third scheduling system 300 (e.g., the proxy module 210) restricts requests of the third-party scheduling service 110 from accessing all other API calls.

e) The proxy module 210 filters information provided back to the third-party scheduling service 110 from the mail server 130 such that only certain types of information (e.g., free time and/or booked time in the calendar for an associate) are provided to the third-party scheduling service 110, and other types of information are blocked, by the proxy module 210, from being provided to the third-party scheduling service 110.

f) The proxy module 210 scans any attachment (e.g., an attachment included with a request received from the third-party scheduling service 110) for viruses and/or other malware prior to providing the attachment to the mail server 130 for posting to someone's calendar or mailbox. If a determination is made that any attachment matches a signature or heuristic of a virus or other malware, the attachment is prevented from reaching the mail server 130. For example, the attachment may be stripped from the request, the request may be quarantined, or the request may be deleted altogether.

g) Connectivity between elements of the third scheduling system 300 is encrypted (i.e., performed using an encrypted communications protocol). For example, hypertext transfer protocol secure (HTTPS) may be used on the connection from the third-party scheduling service 110 to the API management module 112, the connection from the API management module 112 to the proxy module 210, and the connection from the proxy module 210 to the mail server 130.

h) In the third scheduling system 300, a third-party scheduling service only has access to a server/gateway (e.g., the API management module 112 and/or proxy module 210) in a demilitarized zone (DMZ) of the company network, and is required to "proxy"-in (e.g., via the proxy module 210) API calls needed to perform scheduling operations with respect to internal company network resources such as company agent calendars.

i) The proxy module 210 validates company agent emails associated with requests of the third-party scheduling service 110 (e.g., emails of company agents whose calendars are the targets for scheduling operations requested by the requests) by checking the company agent emails against a list of company agent emails of company agents whose calendars are authorized to be accessed by operations of the third-party scheduling service 110 (i.e., a list of authorized company agent emails). The list of authorized company agent emails may be stored in the scheduling system.

j) The proxy module 210 uses the credentials vault 220 to store credentials used to generate tokens for accessing the mail server 130 and the credentials cannot be hard coded and must be accessed from the credentials vault 220.

k) The third scheduling system 300 performs error event logging. An event is to be logged (e.g., to an event center and/or event log of the third scheduling system 300) when an error occurs. Examples of such errors include, but are not limited to, invalid commands, invalid resource emails, and invalid requests.

Example Operation of the Scheduling System and the Proxy Module

In a general operation of the third scheduling system 300, the third-party scheduling service 110 provides a request to the API management module 112. The API management module 112 may verify the source of the request by checking a source IP address of the request against a whitelist identifying authorized third-party vendor IP addresses.

If verification of the source IP address is unsuccessful, the API management module 112 may reject the request. According to at least some example embodiments, the API management module 112 may also log an error even indicating an invalid request.

Alternatively, if verification of the source IP address is successful, the API management module 112 may perform an authentication operation using an encrypted username and secret, for example, in accordance with known authorization methods.

If the authorization operation is unsuccessful, the API management module 112 may reject the request. According to at least some example embodiments, the API management module 112 may also log an error even indicating an invalid request and/or unauthenticated requestor.

Alternatively, if the authorization operation is successful, the API management module 112 may provide the request to the proxy module 210, for example, via the load balancer module 114. Example operations of the proxy module 210 will now be discussed in greater detail below with reference to FIG. 4.

Figure 4:
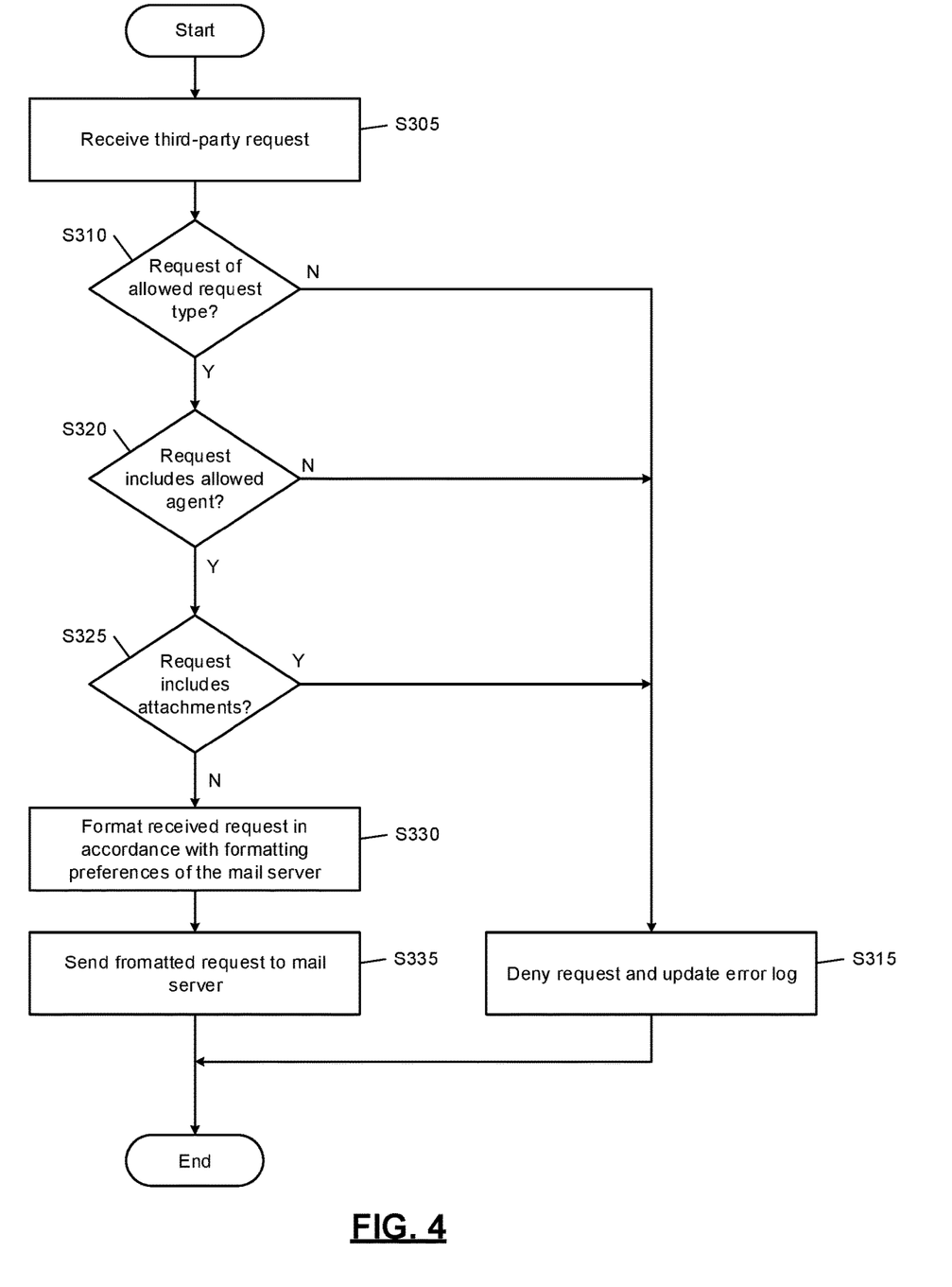
FIG. 4 is a flowchart illustrating a method of operating a proxy module to improve the security of communications between a third-party vendor and a mail server.

FIG. 4 is a flowchart illustrating a method of operating a proxy module to improve the security of communications between a third-party vendor and a mail server.

Referring to FIG. 4, in step S305, the proxy module 210 received a third-party request. For example, the proxy module 210 may receive a scheduling request (e.g., a request for accessing calendar information of a company agent) of the third-party scheduling service 110.

In step S310, the proxy module 210 may determine whether a request type of the received request is an allowed request type. For example, according to at least some example embodiments, the second scheduling system (e.g., the proxy module 210) may define a set of allowed request types of the third-party scheduling service 110 in accordance with security preferences of an owner and/or operator of the third scheduling system 300, the proxy module 210 and/or the mail server 130. According to at least some example embodiments, the proxy module 210 may read the list of allowed request types from a list previously stored in the proxy module 210 or the third scheduling system 300. The following is an example list of allowed request types:

GetUserAvailabilityRequest/GetUserAvailabilityResponse—Request the availability of a resource. Available days/times are returned to a user interface (UI) of the third-party scheduling service 110.

CreateItem/CreateItemResponse—Only for a CalenderItem, request to add an appointment to the calendar.

FindItem/FindItemResponse—Request to find a calendar appointment.

UpdateItem/UpdateItemResponse—Request to update a calendar appointment.

DeleteItem/DeleteItemResponse—Request to delete a calendar appointment.

GetServerTimeZones/GetServerTimeZonesResponse—Returns time zones associated with the mail server 130 (e.g., Microsoft Exchange Server® time zones).

ResolveNames/ResolveNamesResponse—Used for resolving incomplete email addresses.

The request types in the example list of allowed request types provided above are part of an API that Microsoft Corp.

provides for programmatic access to the MICROSOFT EXCHANGE SERVER email system known as Exchange Web Services (EWS). The EWS request type included in the example list of allowed request types provided above are EWS request types that may be used by the scheduling service of the third party vendor TIME TRADE. However, EWS supports a number of request types other than those used by the scheduling service of the third party vendor TIME TRADE. Further, according to at least some example embodiments, the list of allowed request types of the proxy module 210 is configurable, for example, by an owner and/or operator of the third scheduling system 300 and/or the proxy module 210. For example, in a scenario where an owner and/or operator of the third scheduling system 300 and/or the proxy module 210 desires the proxy module 210 to support a service of a different third-party vendor that uses a different set of EWS requests relative to the set of EWS requests used by the scheduling service of the third party vendor TIME TRADE, the owner and/or operator of the third scheduling system 300 and/or the proxy module 210 may configure the list of allowed request types of the proxy module 210 to allow the different set of EWS requests. Thus, according to at least some example embodiments, any time the owner and/or operator of the third scheduling system 300 and/or the proxy module 210 determines that it would be advantageous to allow (or disallow) one or more particular EWS request types, the owner and/or operator of the third scheduling system 300 and/or the proxy module 210 may configured the proxy module 210 accordingly by changing the list of allowed request types of the proxy module 210.

If, in step S310, the proxy module 210 determines that a type of the request received in step S305 is not an allowed request type, the proxy module 210 proceeds to step S315.

In step S315, the proxy module 210 denies (or rejects) the received request. According to at least some example embodiments, in step S315, the proxy module 210 logs an error event (e.g., an invalid request error) at an event center or error log of the third scheduling system 300, in response to determining the request type is not an allowed request type in step S310.

Alternatively, if in step S310, the proxy module 210 determines that a type of the request received in step S305 is an allowed request type, the proxy module 210 proceeds to step S320.

In step S320, the proxy module 210 may determine whether a company agent associated with the received request (e.g., a company agent whose calendar is the target for a scheduling operation requested by the received request) is an allowed company agent. For example, the received request may include an email address of the company agent whose calendar is the target for a scheduling operation requested by the received request. Further, the proxy module 210 may check the email address included in the received request against a list of company agent emails of company agents whose calendars are authorized to be accessed by operations of the third-party scheduling service 110 (i.e., a list of authorized company agent emails). For example, the list of authorized company agent emails may be stored in a database or other storage of the third scheduling system 300 that is accessible by the proxy module 210. Further, the proxy module 210 may check the email address included in the received request against the stored list of authorized company agent emails.

If, in step S320, the proxy module 210 determines that the company agent associated with the request is not an allowed company agent, the proxy module 210 proceeds to step S315.

In step S315, the proxy module 210 denies (or rejects) the received request. According to at least some example embodiments, in step S320 the proxy module 210 logs an error event (e.g., an invalid company agent email) at an event center or error log of the third scheduling system 300, in response to determining that the company agent associated with the request is not an allowed company agent in step S320.

Alternatively, if in step S320, the proxy module 210 determines that the company agent associated with the request is an allowed company agent, the proxy module 210 proceeds to step S325.

In step S325, the proxy module 210 may determine whether the received request included one or more attachments.

According to at least some example embodiments, security preferences of the third scheduling system 300 prohibit requests from including attachments. When requests are prohibited from including attachments by security preferences of the second scheduling system, 200, the proxy module 210 may proceed to step S315 and deny the received request (and log a corresponding error event in the error log or event center of the third scheduling system 300) if any attachments are detected in step S325, and, if no attachments are detected in step S325, the proxy module may proceed to step S330.

Alternatively, according to at least some example embodiments, security preferences of the third scheduling system 300 may not prohibit requests from including attachments. When requests are not prohibited from including attachments by security preferences of the third scheduling system 300, the proxy module 210 may check any attachments included in the received request for viruses and/or other malware, and the proxy module 210 may proceed to step S330 upon determining any of the following:

The received request includes no attachments;

The received request includes one or more attachments and no viruses or other malware was detected in the one or more attachments; or The received request includes one or more attachments, viruses or other malware was detected in the one or more attachments, and any detected viruses or other malware were successfully removed (e.g., through anti-virus procedures performed by the proxy module 210).

The proxy module 210 may proceed to step S315 and deny the received request (and log a corresponding error event in the error log or event center of the third scheduling system 300) if viruses and/or other malware are detected in one or more attachments included in the received request and the detected viruses and/or other malware cannot be removed from the one or more attachments included in the received request (e.g., through anti-virus procedures performed by the proxy module 210).

In step S330, the proxy module 210 formats the received request in accordance with formatting preferences of the mail server 130. For example, specific mail servers, such as Microsoft Exchange Server® may have specific formats by which requests/commands must be received. The proxy module 210 is capable of changing a format of the received request to conform to a required or, alternatively, preferred format of the mail server 130. Accordingly, logic of the proxy module 210 may be configured differently based on a type of mail server 130 included in the third scheduling system 300. For example, if n different deployments of the second scheduling system 200 include n different types of mail servers having, respectively, n different sets of formatting preferences or requirements, then the n proxy modules 210 of the n different deployments of the second scheduling system 200 would include logic for formatting received requests in accordance with the n different sets of formatting preferences or requirements, respectively. Accordingly, the proxy module 210 can be tailored to operate with different types of mail servers with different request formatting requirements.

After step S330, the proxy module proceeds to step S335. In step S335, the proxy module sends the formatted request to the mail server 130. The mail server 130 processes the formatted requests. Further, depending on a type of the request, the mail server may return a response to the proxy module 210 as a result of completing processing of the formatted request. According to at least some example embodiments, the proxy module 210 may filter any response output by the mail server 130 to remove any information that is not authorized to be shared with the third-party scheduling service 110. Any information remaining from the information returned by the mail server 130 after filtering may be forwarded to the third-party scheduling service 110 by the proxy module 210.

According to at least one example embodiment, the proxy module 210 may include or be implemented by one or more circuits or circuitry (e.g., hardware) specifically structured to carry out and/or control some or all of the operations described in the present disclosure as being performed by the proxy module 210 (or an element thereof). According to at least one example embodiment, the proxy module 210 may include or be implemented by a memory and one or more processors executing computer-readable code (e.g., software and/or firmware) that is stored in the memory and includes instructions for causing the one or more processors to carry out and/or control some or all of the operations described in the present disclosure as being performed by the proxy module 210 (or an element thereof). According to at least one example embodiment, the proxy module 210 may include or be implemented by a combination of the above-referenced hardware and software and/or firmware.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A non-transitory computer readable medium storing computer-executable instructions that, when executed by a processor of a proxy module, configures the proxy module to facilitate indirect communication between a centralized mail server within a secured network environment and a third-party scheduling service located outside of the secured network environment and prohibited from directly accessing the centralized mail server by:
   receiving, at the proxy module, a request to access a calendar of a first agent from the third-party scheduling service, the first agent being one of a plurality of agents that directly communicate with the centralized mail server from within the secured network environment to access calendars of the plurality of agents managed by the centralized mail server; and
   selectively reformatting, by the proxy module, the received request to change a format of the received request to a format associated with the centralized mail server and forwarding the reformatted request from the proxy module to the centralized mail server, wherein
      in response to receipt of the reformatted request from the proxy module, the centralized mail server selectively performs a modification to the calendar of the first agent stored on the centralized mail server based on at least data included in the reformatted request, and subsequently synchronizes the modification to the calendar of the first agent with an end user device associated with the first agent.

2. The non-transitory computer readable medium of claim 1, wherein the computer-executable instructions, when executed further configures the proxy module to facilitate the indirect communication between the centralized mail server and the third-party scheduling service by:
   determining whether a request type of the received request is an allowed request type; and
   determining whether the first agent is an allowed agent, and
      wherein the selectively reformatting reformats the received request to the reformatted request, in response to the proxy module determining that the request type is the allowed request type and the first agent is the allowed agent.

3. The non-transitory computer readable medium of claim 2, wherein the computer-executable instructions, when executed further configures the proxy module to determine whether the first agent is the allowed agent by,
   referencing, by the proxy module, previously stored email information indicating emails of allowed agents, and
   determining whether the first agent is one of the allowed agents based on the emails of the allowed agents indicated by the previously stored email information.

4. The non-transitory computer readable medium of claim 1, wherein the computer-executable instructions, when executed further configures the proxy module to facilitate the indirect communication between the centralized mail server and the third-party scheduling service by:
   logging one or more error events, in response to detecting one or more error events.

5. The non-transitory computer readable medium of claim 1, wherein the computer-executable instructions, when executed further configures the proxy module to facilitate the indirect communication between the centralized mail server and the third-party scheduling service by:

determining whether the received request includes one or more attachments.

6. The non-transitory computer readable medium of claim 5, wherein the computer-executable instructions, when executed further configures the proxy module to facilitate the indirect communication between the centralized mail server and the third-party scheduling service by:
preventing one or more attachments from being sent to the centralized mail server, in response to determining that the received request includes the one or more attachments.

7. The non-transitory computer readable medium of claim 5, wherein the computer-executable instructions, when executed further configures the proxy module to facilitate the indirect communication between the centralized mail server and the third-party scheduling service by:
in response to determining that the received request includes one or more attachments, determining whether the one or more attachments include a virus or other malware;
in response to determining that the one or more attachments include the virus or other malware, preventing the one or more attachments from being sent to the centralized mail server; and
in response to determining that the one or more attachments do not include the virus or other malware, sending the one or more attachments to the centralized mail server with the received request.

8. The non-transitory computer readable medium of claim 1, wherein the received request is associated with scheduling an appointment with the first agent.

9. The non-transitory computer readable medium of claim 8, wherein the received request includes an email of the first agent.

10. The non-transitory computer readable medium of claim 1, wherein:
the received request is received, at the proxy module, via an encrypted communications protocol, and
the reformatted request is provided, by the proxy module to the centralized mail server, via the encrypted communications protocol.

11. A centralized mail server configured to operate within a secured network environment to manage calendars of a plurality of agents, the centralized mail server being directly accessible by the plurality of agents from within the secured network environment to allow the plurality of agents to access calendars of the plurality of agents managed by the centralized mail server, the centralized mail server comprising:
a memory storing computer-executable instructions; and
at least one processor configured to execute the computer-executable instructions to,
receive, from a proxy module configured to facilitate indirect communication between the centralized mail server and a third-party scheduling service located outside of the secured network environment and prohibited from directly accessing the centralized mail server, a reformatted request, the reformatted request being generated by the proxy module i) selectively reformatting a request to access a calendar of a first agent of the plurality of agents received from the third-party scheduling service to change a format of the request to a format associated with the centralized mail server, and ii) forwarding the reformatted request to the centralized mail server,
selectively perform a modification to the calendar of the first agent stored on the centralized mail server based on at least data included in the reformatted request, and
synchronize the modification to the calendar of the first agent with an end user device associated with the first agent.

12. The centralized mail server of claim 11, wherein the centralized mail server is configured to receive the reformatted request, in response to the proxy module determining that a request type of the request from the third-party scheduling service is an allowed request type and determining that the first agent is an allowed agent.

13. The centralized mail server of claim 12, wherein the first agent is determined as the allowed agent by,
referencing previously stored email information indicating emails of allowed agents, and
determining whether the first agent is one of the allowed agents based on the emails of the allowed agents indicated by the previously stored email information.

14. The centralized mail server of claim 11, wherein the centralized mail server is configured to receive the reformatted request such that the reformatted request selectively omits one or more attachments contained the request from the third-party scheduling service.

15. The centralized mail server of claim 11, wherein the centralized mail server is configured to receive the reformatted request from the proxy module via an encrypted communications protocol.

* * * * *